United States Patent
Bohm et al.

(10) Patent No.: US 10,996,139 B2
(45) Date of Patent: May 4, 2021

(54) HEALTH MONITORING SYSTEM

(71) Applicant: Aktiebolaget SKF, Gothenburg (SE)

(72) Inventors: Anthony C. Bohm, Chicago, IL (US); Arun Menon, Roscoe, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 382 days.

(21) Appl. No.: 16/128,072

(22) Filed: Sep. 11, 2018

(65) Prior Publication Data

US 2020/0080915 A1 Mar. 12, 2020

(51) Int. Cl.
*G01M 13/045* (2019.01)
*F16C 27/00* (2006.01)

(52) U.S. Cl.
CPC .......... *G01M 13/045* (2013.01); *F16C 27/00* (2013.01)

(58) Field of Classification Search
CPC .... G01M 13/045; G01M 13/04; G01M 17/04; G01M 99/007; G01N 3/56; G01N 3/32; G01H 1/14; B60R 2011/0003; B60R 2011/0052; F16C 27/00
USPC ................... 73/593, 587, 659, 660
See application file for complete search history.

(56) References Cited

U.S. PATENT DOCUMENTS

| | | | | |
|---|---|---|---|---|
| 3,456,495 A | * | 7/1969 | Stinger | G01N 3/38 73/575 |
| 3,933,032 A | * | 1/1976 | Tschoegl | G01N 3/38 73/584 |
| 4,352,292 A | * | 10/1982 | Madigosky | G01N 29/12 73/574 |
| 5,365,457 A | * | 11/1994 | Madigosky | G01H 15/00 600/552 |
| 5,452,614 A | * | 9/1995 | Kato | G01N 3/38 73/789 |

* cited by examiner

*Primary Examiner* — Lisa M Caputo
*Assistant Examiner* — Rose M Miller
(74) *Attorney, Agent, or Firm* — J-TEK Law PLLC; Scott T. Wakeman; Mark A. Ussai

(57) ABSTRACT

A health and condition monitoring system of an elastomeric component comprising an actuator, a sensor, and a processing unit. The sensor and the actuator need to be attached directly or indirectly to the elastomeric component. The actuator induces an impulse, or possibly a chirp, into the elastomeric component. The sensor senses the response, the impulse response function. The processing unit analyzes the impulse response function and determines a health and condition indicator. This is repeated and when enough indicators have been determined, then a health and condition marker can be determined, covering if the elastomeric component is in a start period of usage, in a main usage period or in a final period of usage.

22 Claims, 3 Drawing Sheets

HEALTH MONITORING SYSTEM

TECHNOLOGICAL FIELD

The invention concerns elastomeric components, such as bearings and dampers, and is more particularly directed to monitoring the condition of laminated elastomeric bearings used in rotary-wing aircraft.

BACKGROUND

A laminated elastomeric bearing comprises a laminated elastomeric unit as well as interface members attached to the laminated elastomeric unit. The laminated elastomeric unit comprises alternating elastomer and stiff layers, such as metallic layers, vulcanized together in a molding process. In most circumstances the interface members are also a part of the molding process and thus vulcanized together with the laminated elastomeric unit. The geometry of the layers as well as that of the interface members of the elastomeric bearing can vary depending on the application.

Elastomeric bearings are for example used in rotor aircrafts, such as helicopters. The elastomeric bearings experience a change in stiffness with usage, age and environmental conditions. The elastomer unit is stressed in shear by the relative movement of the interface members. This can lead to cracks in the elastomer unit and eventually cause it to fail. Currently determination of the health, or the condition of these bearings is purely based on visual inspection. US2005/0073111 Elastomeric member provided with monitoring means, describes how an elastomeric member is provided with graduations on its visible surface, thus making it possible to evaluate and monitor propagation of a crack merely by inspecting it visually. There is still room for improvements.

SUMMARY

An object of the invention is to define a method and a system monitoring the health and condition of an elastomeric component.

The aforementioned object is achieved according to the invention by a health and condition monitoring system of an elastomeric component. According to the invention the system comprises at least one actuator, at least one sensor and at least one processing unit. The at least one actuator to converts electrical signals to a physical force. The actuator can be a piezo actuator, such as a piezo stack actuator. The at least one sensor is arranged to convert one or more physical magnitudes to electrical sensor signals. The sensor can be a piezoelectric accelerometer. The at least one sensor and the at least one actuator are attached directly or indirectly to the elastomeric component. The processing unit controls the at least one actuator to induce a physical force into the elastomeric component by means of an actuator signal. Thereafter the processing unit records a response signal received from the at least one sensor and analyses the recorded response signal to thereby determine and store at least one health and condition indicator.

In some embodiments the processing unit determines if the elastomeric component is in use or not by analyzing the sensor signals to identify vibrations that are an indication of usage. This is done to keep track of the number of hours the elastomeric component is being used and to correlate the at least one health and condition indicator with the number of hours used. In other embodiments the system further comprises a vibration energy harvester. In these embodiments it can be advantageous if the processing unit determines if the elastomeric component is in use or not by analyzing an output of the vibration energy harvester if its level corresponds to vibrations that are an indication of usage. This is then also to thereby keep track of the number of hours the elastomeric component is being used and to thereby also correlate the at least one health and condition indicator with the number of hours used.

Advantageously the processing unit tracks and analyzes multiple stored health and condition indicators over time to determine if the elastomeric component is in a start period, a main usage period, or in a final period of its lifespan, each period being represented by a health and condition marker. The start period has a characteristic of the stiffness of the elastomeric component slowly rising/increasing with usage. The main usage period can be several thousands of hours of use when the stiffness of the elastomeric has a relatively limited variance. Entering the final period is possible to be determined to a second slow rise/increase of stiffness with usage. The elastomeric component will then start to reach its end of life when the stiffness starts to fall, become less. Suitably the processing unit performs a calibration of the determination of the main usage period and the final period by means of the determination of the start period. The processing unit can preferably set the health and condition marker to a warning when the final period is determined. The processing unit can then also add an end of life count-down counter based on an estimated number of usage hours left, counting down remaining life as from when the final period was determined. Advantageously the system further comprises a communication unit. A communication unit can communicate, via optical, wired or wireless, at least one of: a health and condition marker, a health and condition indicator, and a recorded response signal. The communication unit can in some embodiments comprise visual means to indicate the health and condition of an elastomeric component during a visual inspection and also to identify the elastomeric component, which on its own is also useful for, for example, a maintenance.

In some embodiments the elastomeric component is a laminated elastomeric component. Of these embodiments the laminated elastomeric component is sometimes then a part of a laminated elastomeric bearing. The at least one sensor and the at least one actuator are then attached directly or indirectly to the laminated elastomeric bearing.

One health and condition indicator can be a relative stiffness of the elastomeric component, another health and condition indicator can be a damping ratio of the elastomeric component.

The actuator signal can suitably be a pulse to induce a physical impulse into the elastomeric component. The response signal is then an impulse response function. In some embodiments the actuator signal is a chirp to induce a varying frequency excitation into the elastomeric component. In further embodiments the actuator signal can be between a chirp and a pulse.

The different additional enhancements of the system according to the invention can be combined in any desired manner as long as no conflicting features are combined.

The aforementioned object is also achieved according to the invention by a method of monitoring the health and condition of an elastomeric component. According to the invention the method comprises the steps of inducing, recording, analyzing and determining. In the inducing step a physical force impulse is induced into the elastomeric component by means of at least one actuator that is attached directly or indirectly to the elastomeric component. In the recording step, a response, an impulse response function, is recorded. The impulse response function is the response of the elastomeric component to the induced impulse and measured by means of at least one sensor attached directly or indirectly to the elastomeric component. The analyzing step analyzes the recorded impulse response function. The determining step, determines at least one health and condition indicator based on the analysis done in the analyzing step.

The at least one health and condition indicator can be a relative stiffness of the elastomeric component and/or a damping ratio of the elastomeric component.

In some embodiments the method further comprises the steps of tracking and determining period. The tracking step tracks multiple determined health and condition indicators over time. The determining period step determines if the elastomeric component is in a start period, a usage period, or in a final period of use, by means of the tracking.

The different additional enhancements of the sensor bearing assembly according to the invention can be combined in any desired manner as long as no conflicting features are combined.

A primary purpose of the invention is to provide a means to be able to reliably apply metrics that can assist in determining the condition and/or remaining useful life of elastomeric bearings as compared to purely relying on visual inspections. This is done by a health and condition monitoring system of an elastomeric component according to the invention. The system comprises an actuator, a sensor, and a processing unit. The sensor and the actuator need to be attached directly or indirectly to the elastomeric component. The actuator induces an impulse, or possibly a chirp, into the elastomeric component. The sensor senses the response, the impulse response function. The processing unit analyzes the impulse response function and determines a health and condition indicator. This is repeated and when enough indicators have been determined, then a health and condition marker can be determined, covering if the elastomeric component is in a start period of usage, in a main usage period or in a final period of usage. The elastomeric component can be a laminated elastomeric component, which in turn is a part of a laminated elastomeric bearing.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 6.

Figure 1:
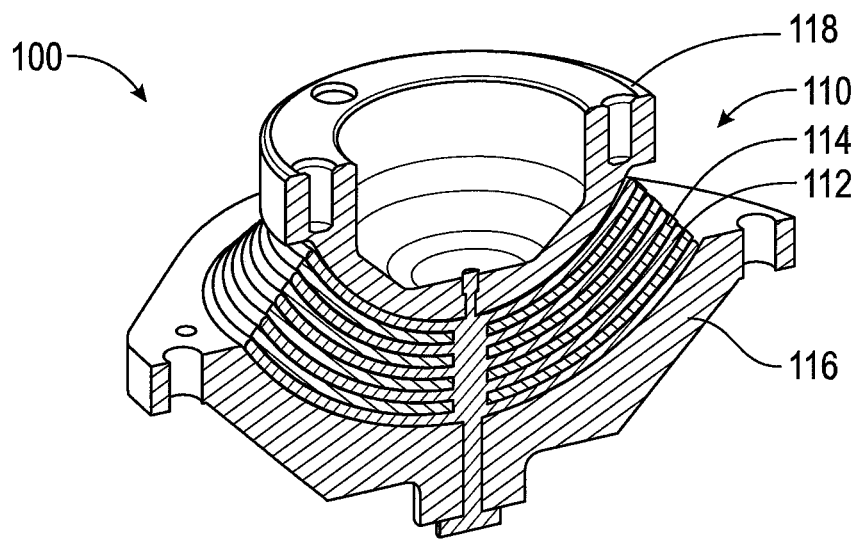
FIG. 1 illustrates an example of a laminated elastomeric bearing.

FIG. 1 illustrates an example of a laminated elastomeric bearing 100. It can suitably be used for retaining and hinging a blade to a hub of a rotor for a rotary-wing aircraft. The elastomeric bearing 100 comprises a laminated elastomeric unit 110 being essentially a stack of elastomer 112 and rigid strength members 114 in the form of spherical caps. The elastomeric unit 110 is arranged between an inner interface member 116 and an outer interface member 118. The interface members 116, 118 are able to twist and bend in relation to each other due to the laminated elastomeric unit, stressing the elastomer 112. In this example the outer interface member 118 is a radial support secured to the hub, where outer is relative to the axis of the rotor, and the inner interface member 116 is an inner radial support secured to a root portion of a corresponding blade. The laminated elastomeric bearing is used to provide some movement, such as pitching the blades, and to provide damping, due to movement such as flapping movements that are transmitted by a blade to the radially inner support of the elastomeric bearing.

As previously mentioned, the health of a laminated elastomeric bearing is traditionally done by visual inspection. Determining if a laminated elastomeric bearing is stiff enough to be able to flex back and to determine if it still is able to damp out undesirable vibrations and chocks, is not possible by visual inspection. Visual inspection is only able to determine if there are cracks or some other visual indication that the health of the laminated elastomeric bearing is deteriorating.

According to the invention it is possible to do health and condition monitoring of a laminated elastomeric bearing remotely by means of at least an actuator and a sensor mounted on or within one or both of the interface members. By subjecting the bearing to a known induced signal, picking up a response of the bearing to this induced signal, and then analyzing the frequency response function that is a measurable quantity relating the input and output of the system as a function of its dynamic properties, the health and condition of the bearing can be determined. This can of course be combined with a visual inspection. Some embodiments of the invention may include an LED visibly placed on/in the bearing to thereby be able to also visually indicate the current health and condition of the bearing.

Figure 2:
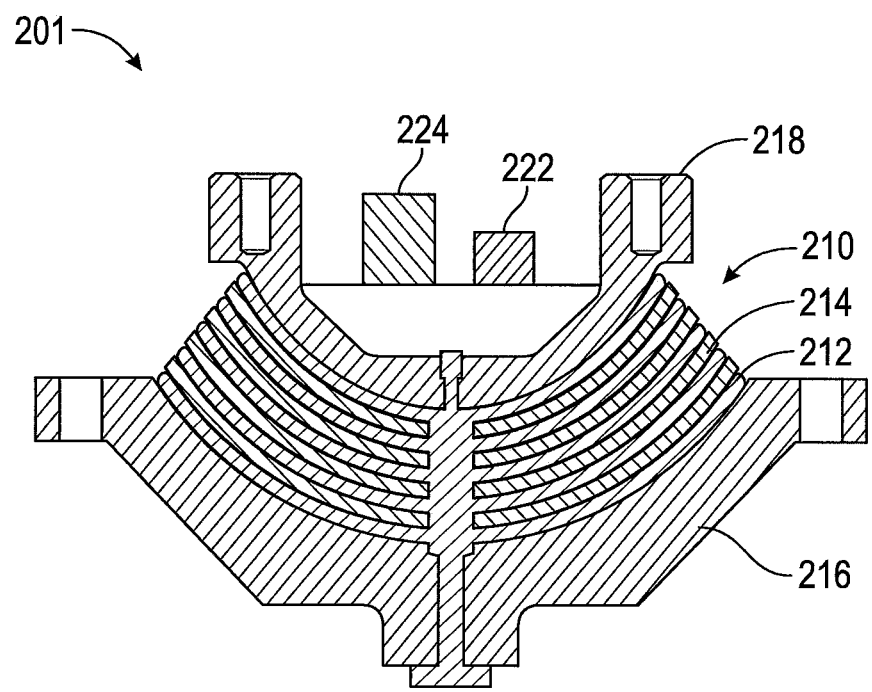
FIG. 2 illustrates an instrumented laminated elastomeric bearing according to the invention.

FIG. 2 illustrates an instrumented laminated elastomeric bearing 201 according to the invention. As the laminated elastomeric bearing 100 of FIG. 1, this bearing also comprises a laminated elastomeric unit 210 with stacked layers of elastomer 212 and rigid strength members 212 where the laminated elastomeric unit 210 is coupled in-between an inner interface member 216 and an outer interface member 218. In this embodiment an actuator 222 and a sensor 224 are mounted within the outer interface member 218. The placement of the sensor 224 and the actuator 222 is not restricted to one or the other interface member, they can both be in or on the inner interface member, or even with the sensor 224 in or on one interface member and the actuator 222 in or on the other interface member. In other embodiments there can two or more sensors and/or two or more actuators.

Only a sensor and an actuator needs to be located on or in an interface member, while further electronics may be placed somewhere else. It is however advantageous if at least some of the electronics is placed in close proximity to a sensor and an actuator, preferably all. A suitable place is within one of the interface members, such as close together to a sensor and an actuator placed as is illustrated in FIG. 2.

Figure 3:
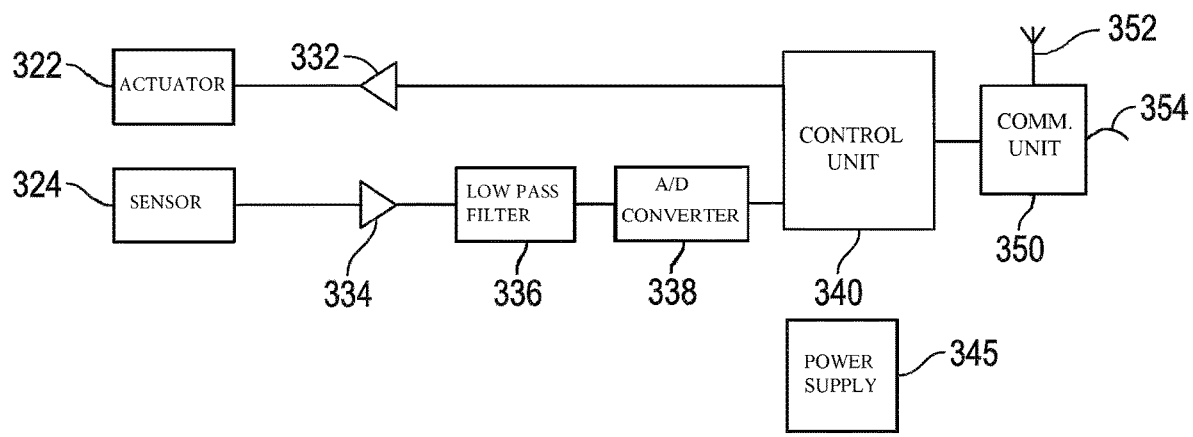
FIG. 3 illustrates a block diagram of an actuator, sensor and signal processing and further electronics of the instrumentation of a health and condition monitoring system according to the invention.

FIG. 3 illustrates a block diagram of the actuator 322, sensor 324 and signal processing 332, 334, 336, 338, 340, and further electronics 345, 350, 352, 354 of the instrumentation of a health and condition monitoring system according to the invention. The signal processing and control unit 340 is the center of the system. It initiates a measurement sequence by sending a signal, such as a pulse/impulse or a chirp, to the power amplifier 332 and the amplified signal then goes to the actuator 322, which can be a stacked piezo electric actuator. The actuator 322 is preferably arranged such that the generated force, be it impulse or chirp, is directed in the lowest stiffness direction of the bearing it is attached to. This force causes the bearing to oscillate around its base. The response to the impulse or chirp is picked up/measured by the sensor 324. The response signal is then amplified/buffered 334 before it is low-pass filtered 336 to ensure that the following A/D converter 338 operates at a sampling rate greater than twice the highest frequency of the low-pass filtered response signal. After A/D conversion 338, the now digital response signal undergoes purely digital signal processing. The digital signal processing analyses the digital response signal both in the time domain and in the frequency domain after Fourier transformation, suitably by a Fast Fourier Transformation or the like. In the time domain the response signal is typically analyzed as to amplitude in relation to time. In the frequency domain the analysis can for example be in relation to one or more of spectrum, power spectrum, power spectral density, cross power spectrum, transfer function, frequency response function (FRF) and coherence function.

The measurement and analysis would be done at regular intervals when the laminated elastomeric bearing is in use, suitably before and/or after a flight, keeping track of when, since directly after a flight the bearing will in most circumstances have reached a higher temperature than it had before the flight. In can be advantageous to also at the same time as acquiring a response signal measure the bearing temperature, suitably measuring as close to, or directly at, the laminated elastomeric unit. Suitably also one or more environmental conditions are measured, such as temperature and humidity.

When a response signal measurement and analysis has been done, the result(s) can be communicated to a central monitoring station by means of the communication unit 350. The communication unit transfer result(s) either by means of a wire connection 354, which in turn later can comprise wireless transmission, or wireless 352. As mentioned, the communication unit can in addition or only comprise an LED or the like to visually communicate the condition/health, which can be green or nothing for a healthy status, orange indicating that it is time to schedule a maintenance and red indicating that maintenance needs to be done immediately.

The power supply 345, which can comprise one or more of energy harvesting, energy storage, power converter(s), filter(s), and an external energy connection. Energy harvesting can suitably be vibration energy harvesting. Energy storage can be a conventional battery and/or super cap.

Only the sensor 324 and the actuator 322 need to be located on or in the laminated elastomeric bearing. Most advantageously all of the electronics are housed within the bearing using wireless for communication with a possible addition of an LED. If many laminated elastomeric bearings are located close together, it is very useful to be able to easily identify by means of an LED which one(s) are in need of service/maintenance.

Figure 4:
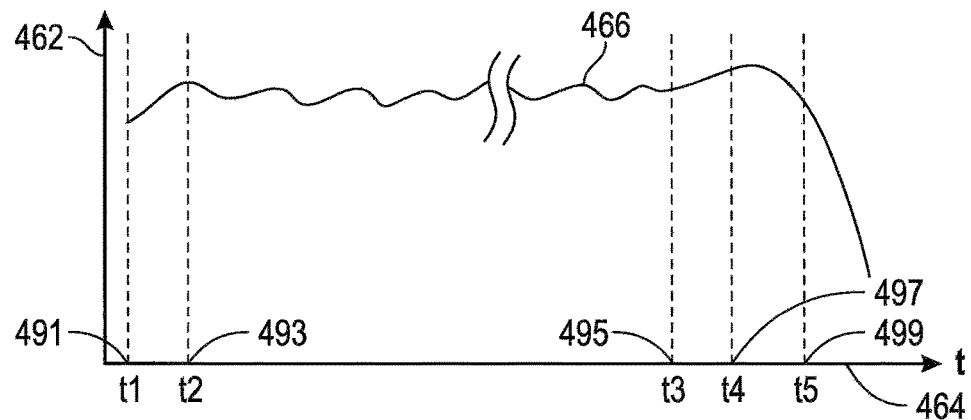
FIG. 4 illustrates a relative stiffness curve, in a diagram of relative stiffness over time, of a laminated elastomeric bearing in use, during its lifetime.

FIG. 4 illustrates a relative stiffness curve 466, in a diagram of relative stiffness 462 over time 464, of a laminated elastomeric bearing in use, during its lifetime. At the start of use, t1 491, there is a starting point of an initial increase of relative stiffness. This increase in relative stiffness continues until t2 493 marking an end to the initial increase of relative stiffness phase and the beginning a long period of only small variations in relative stiffness occur until t3 495. The period between t2 493 and t3 495 is commonly in the range of thousands of hours of use. At t3 495 a second detectable and determinable increase of relative stiffness starts and keeps on until t4 497. After the end t4 497 of the final increase of relative stiffness comes the end of life t5 499 when the stiffness decreases more and more as the bearing is deteriorating. Tests have indicated that from a point in time that the final increase of stiffness has been determined, that is somewhere between t3 495 and t4 497, there are somewhere between a hundred to a few hundreds of hours usage left before the end of life at t5 499 is reached. This is in most cases quite sufficient to be able to schedule a replacement maintenance for the laminated elastomeric bearing in question.

Figure 5:
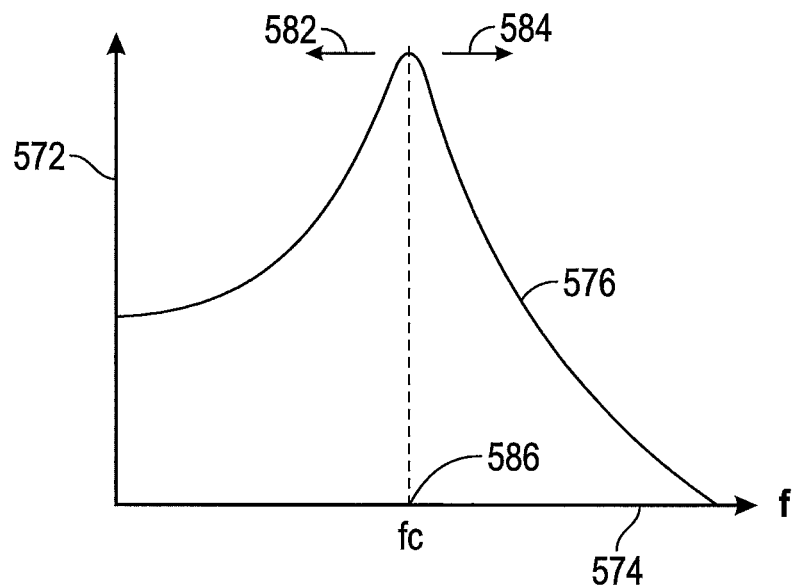
FIG. 5 illustrates a response curve in the frequency domain to determine relative stiffness of an elastomeric bearing.

The relative stiffness can be determined in different ways, one is through integration of the response and another is by determining and keeping track of resonant peaks in the response. FIG. 5 illustrates a response curve 576 in the frequency domain with amplitude 572 to frequency 574, to determine relative stiffness of an elastomeric bearing. First a center frequency fc 586 of a resonant peak in the response is determined. It is then compared to the previous center frequency of a previous response. If the center frequency fc 586 has increased, then the elastomeric bearing has become stiffer, if on the other hand it has decreased 582, then it has become less stiff.

Figure 6:
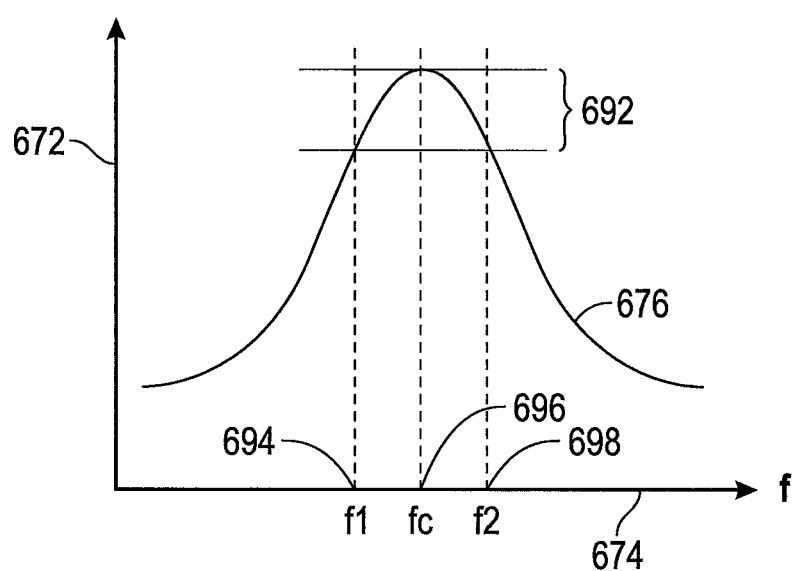
FIG. 6 illustrates a response curve in the frequency domain to determine an estimate of the damping in an elastomeric bearing.

As mentioned previously, also the damping of the elastomeric bearing is important to determine its health and condition. Damping is an influence on an oscillating system and characterizes its ability of reducing or attenuating oscillations. FIG. 6 illustrates a response curve 676 in the frequency domain with amplitude 672 to frequency 674 to determine an estimate of the damping in an elastomeric bearing. First a center frequency fc 696 of a resonant peak in the response is determined. Then from a level of −3 db 692 from the peak, the two frequencies, f1 694 and f2 698, that corresponds to where the −3 db crosses the response curve 676 are used together with the center frequency fc 696 to determine an estimate of a damping ratio of the elastomeric bearing by (f2−f1)/(2fc).

The invention is based on the basic inventive idea of inducing an impulse into an elastomeric component and then analyzing the impulse response function over time. The invention is not restricted to the above-described embodiments, but may be varied within the scope of the following claims.

FIG. 1 illustrates an example of a laminated elastomeric bearing:
100 Laminated elastomeric bearing,
110 Laminated elastomeric unit,
112 Elastomer,
114 Rigid strength member,
116 Inner interface member, 118 Outer interface member,
FIG. 2 illustrates an instrumented laminated elastomeric bearing according to the invention:
201 Instrumented laminated elastomeric bearing according to the invention,
210 Laminated elastomeric unit,
212 Elastomer,
214 Rigid strength member,
216 Inner interface member,
218 Outer interface member,
222 Actuator,
224 Sensor,
FIG. 3 illustrates a block diagram of the actuator, sensor and signal processing and further electronics of the instrumentation of a health and condition monitoring system according to the invention:
322 Actuator,
324 Sensor,
332 Power amplifier for actuator,
334 Sensor preamplifier/buffer,
336 Low pass filter to restrict the bandwidth such that a following A/D converter operates at a sampling rate greater than twice the bandwidth,
338 Analogue to Digital Converter operating at a sampling rate greater than twice the bandwidth of the low pass filter,
340 Signal processing and control unit,
345 Power supply, which can be one or more of energy harvesting, such as vibration energy harvesting, energy storage, such as battery and/or super cap, power converter(s), filter(s), and an external energy connection,
350 Communication unit,
352 Antenna for wireless communication,
354 Wires or optical fiber for wired communication
FIG. 4 illustrates a relative stiffness curve, in a diagram of relative stiffness over time, of a laminated elastomeric bearing in use, during its lifetime:
462 Relative stiffness,
464 Time,
466 Relative stiffness curve over the lifetime of a laminated elastomeric bearing in use,
491 t1—Start of use, start of initial increase of relative stiffness
493 t2—End of initial increase of relative stiffness,
495 t3—Start of final increase of relative stiffness,
497 t4—End of final increase of relative stiffness,
499 t5—End of life
FIG. 5 illustrates a response curve in the frequency domain to determine relative stiffness of an elastomeric bearing:
572 Amplitude,
574 Frequency,
576 Response curve,
582 Frequency of center frequency decreasing,
584 Frequency of center frequency rising,
586 fc, center frequency.
FIG. 6 illustrates a response curve in the frequency domain to determine an estimate of the damping in an elastomeric bearing:
672 Amplitude,
674 Frequency,
676 Response curve,
692 −3 db,
694 f1,
696 fc, center frequency.
698 f2.

What is claimed is:

1. A health and condition monitoring system of an elastomeric component, the system comprising:
at least one actuator to convert electrical signals to a physical force;
at least one sensor arranged to convert one or more physical magnitudes to electrical sensor signals; and
a processing unit; and
wherein the at least one sensor and the at least one actuator are attached directly or indirectly to the elastomeric component, and wherein the processing unit is configured to control the at least one actuator to induce a physical force into the elastomeric component by means of an actuator signal, and wherein the processing unit is configured to record a response signal received from the at least one sensor and to analyze the recorded response signal to thereby determine and store at least one health and condition indicator; and
wherein the elastomeric component is a laminated elastomeric component of a laminated elastomeric bearing and the at least one sensor and the at least one actuator are attached directly or indirectly to the laminated elastomeric bearing.

2. The health and condition monitoring system according to claim 1, wherein the processing unit is configured to determine if the elastomeric component is in use or not by analyzing the sensor signals to identify vibrations that are an indication of usage, to thereby keep track of the number of hours the elastomeric component is being used and to correlate the at least one health and condition indicator with the number of hours used.

3. The health and condition monitoring system according to claim 1, wherein the system further comprises a vibration energy harvester and wherein the processing unit is configured to determine if the elastomeric component is in use or not in use by analyzing an output of the vibration energy harvester if its level corresponds to vibrations that are an indication of usage, to thereby track the number of hours the elastomeric component is in use and to correlate the at least one health and condition indicator with the number of hours of use.

4. The health and condition monitoring system according to claim 1, wherein the processing unit is configured to track and analyze multiple stored health and condition indicators over time to determine if the elastomeric component is in a start period, a main usage period, or in a final period of its lifespan, each period being represented by a health and condition marker.

5. The health and condition monitoring system according to claim 4, wherein the processing unit is configured to perform a calibration of the determination of the main usage period and the final period by means of the determination of the start period.

6. The health and condition monitoring system according to claim 4, wherein the processing unit is configured to set the health and condition marker to a warning when the final period is determined.

7. The health and condition monitoring system according to claim 6, wherein the processing unit is configured to add an end of life count-down counter based on an estimated number of usage hours left, counting down remaining life from a point when the final period was determined.

8. The health and condition monitoring system according to claim 4, wherein the system further comprises a communication unit configured to communicate at least one of: a health and condition marker, a health and condition indicator, and a recorded response signal.

9. The health and condition monitoring system according to claim 8, wherein the communication unit comprises visual means to indicate the health and condition of an elastomeric component during a visual inspection and to identify the elastomeric component.

10. The health and condition monitoring system according to claim 8, wherein the communication unit comprises visual means to identify an elastomeric component in question for a maintenance.

11. The health and condition monitoring system according to claim 1, wherein at least one of the at least one health and condition indicator is a relative stiffness of the elastomeric component.

12. The health and condition monitoring system according to claim 1, wherein at least one of the at least one health and condition indicator is a damping ratio of the elastomeric component.

13. The health and condition monitoring system according to claim 1, wherein the actuator signal is a pulse to induce a physical impulse into the elastomeric component, where then the response signal is an impulse response function.

14. The health and condition monitoring system according to claim 1, wherein the actuator signal is a chirp to induce a varying frequency excitation into the elastomeric component.

15. A method of monitoring the health and condition of an elastomeric component, wherein the method comprises the steps of:
- inducing a physical force impulse into the elastomeric component by means of at least one actuator that is attached directly or indirectly to the elastomeric component;
- recording a response of the elastomeric component to the induced impulse by means of at least one sensor attached directly or indirectly to the elastomeric component;
- analyzing the recorded response; and
- determining at least one health and condition indicator based on the analysis;
- wherein the at least one health and condition indicator is a damping ratio of the elastomeric component.

16. The method of monitoring the health and condition of an elastomeric component according to claim 15, wherein the at least one health and condition indicator is a relative stiffness of the elastomeric component.

17. The method of monitoring the health and condition of an elastomeric component according to claim 15, wherein the method further comprises the steps of:
- tracking multiple determined health and condition indicators over time; and
- determining if the elastomeric component is in a start period, a usage period, or in a final period of use, by means of the tracking.

18. A health and condition monitoring system of an elastomeric component, the system comprising:
- at least one actuator to convert electrical signals to a physical force;
- at least one sensor arranged to convert one or more physical magnitudes to electrical sensor signals; and
- a processing unit; and
- wherein the at least one sensor and the at least one actuator are attached directly or indirectly to the elastomeric component, and wherein the processing unit is configured to control the at least one actuator to induce a physical force into the elastomeric component by means of an actuator signal, and wherein the processing unit is configured to record a response signal received from the at least one sensor and to analyze the recorded response signal to thereby determine and store at least one health and condition indicator; and
- wherein the processing unit is configured to determine if the elastomeric component is in use or not by analyzing the sensor signals to identify vibrations that are an indication of usage, to thereby keep track of the number of hours the elastomeric component is being used and to correlate the at least one health and condition indicator with the number of hours used.

19. A health and condition monitoring system of an elastomeric component, the system comprising:
- at least one actuator to convert electrical signals to a physical force;
- at least one sensor arranged to convert one or more physical magnitudes to electrical sensor signals; and
- a processing unit; and
- wherein the at least one sensor and the at least one actuator are attached directly or indirectly to the elastomeric component, and wherein the processing unit is configured to control the at least one actuator to induce a physical force into the elastomeric component by means of an actuator signal, and wherein the processing unit is configured to record a response signal received from the at least one sensor and to analyze the recorded response signal to thereby determine and store at least one health and condition indicator; and
- wherein the system further comprises a vibration energy harvester and wherein the processing unit is configured to determine if the elastomeric component is in use or not in use by analyzing an output of the vibration energy harvester if its level corresponds to vibrations that are an indication of usage, to thereby track the number of hours the elastomeric component is in use and to correlate the at least one health and condition indicator with the number of hours of use.

20. A health and condition monitoring system of an elastomeric component, the system comprising:
- at least one actuator to convert electrical signals to a physical force;
- at least one sensor arranged to convert one or more physical magnitudes to electrical sensor signals; and
- a processing unit; and
- wherein the at least one sensor and the at least one actuator are attached directly or indirectly to the elastomeric component, and wherein the processing unit is configured to control the at least one actuator to induce a physical force into the elastomeric component by means of an actuator signal, and wherein the processing unit is configured to record a response signal received from the at least one sensor and to analyze the recorded response signal to thereby determine and store at least one health and condition indicator; and
- wherein the processing unit is configured to track and analyze multiple stored health and condition indicators over time to determine if the elastomeric component is in a start period, a main usage period, or in a final period of its lifespan, each period being represented by a health and condition marker.

21. A health and condition monitoring system of an elastomeric component, the system comprising:
- at least one actuator to convert electrical signals to a physical force;
- at least one sensor arranged to convert one or more physical magnitudes to electrical sensor signals; and
- a processing unit; and
- wherein the at least one sensor and the at least one actuator are attached directly or indirectly to the elastomeric component, and wherein the processing unit is configured to control the at least one actuator to induce a physical force into the elastomeric component by means of an actuator signal, and wherein the processing unit is configured to record a response signal received from the at least one sensor and to analyze the recorded response signal to thereby determine and store at least one health and condition indicator; and wherein at least one of the at least one health and condition indicator is a damping ratio of the elastomeric component.

22. A method of monitoring the health and condition of an elastomeric component, wherein the method comprises the steps of:

inducing a physical force impulse into the elastomeric component by means of at least one actuator that is attached directly or indirectly to the elastomeric component;

recording a response of the elastomeric component to the induced impulse by means of at least one sensor attached directly or indirectly to the elastomeric component;

analyzing the recorded response;

determining at least one health and condition indicator based on the analysis;

tracking multiple determined health and condition indicators over time; and determining if the elastomeric component is in a start period, a usage period, or in a final period of use, by means of the tracking.

* * * * *